(12) United States Patent
Kim et al.

(10) Patent No.: US 12,476,251 B2
(45) Date of Patent: *Nov. 18, 2025

(54) GLOBULAR CARBON-BASED ANODE ACTIVE MATERIAL, METHOD FOR MANUFACTURING SAME, AND ANODE AND LITHIUM SECONDARY BATTERY COMPRISING SAME

(71) Applicant: LG ENERGY SOLUTION, LTD., Seoul (KR)

(72) Inventors: Hyun-Chul Kim, Daejeon (KR); Sang-Wook Woo, Daejeon (KR); Dong-Sub Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 756 days.

This patent is subject to a terminal disclaimer.

(21) Appl. No.: 17/641,322

(22) PCT Filed: Sep. 29, 2020

(86) PCT No.: PCT/KR2020/013430
§ 371 (c)(1),
(2) Date: Mar. 8, 2022

(87) PCT Pub. No.: WO2021/066582
PCT Pub. Date: Apr. 8, 2021

(65) Prior Publication Data
US 2022/0344660 A1    Oct. 27, 2022

(30) Foreign Application Priority Data
Oct. 4, 2019 (KR) .................. 10-2019-0123397

(51) Int. Cl.
*H01M 4/587* (2010.01)
*H01M 4/04* (2006.01)
(Continued)

(52) U.S. Cl.
CPC ......... *H01M 4/587* (2013.01); *H01M 4/0404* (2013.01); *H01M 10/052* (2013.01); *H01M 2004/021* (2013.01); *H01M 2004/027* (2013.01)

(58) Field of Classification Search
CPC .............. H01M 4/587; H01M 4/0404; H01M 2004/021; H01M 2004/027;
(Continued)

(56) References Cited

U.S. PATENT DOCUMENTS 7,776,472 B2   8/2010   Kim et al.
7,947,394 B2   5/2011   Takei et al.
(Continued)

FOREIGN PATENT DOCUMENTS

CN   108933240 A   12/2018
JP   7-107853 B2   11/1995
(Continued)

OTHER PUBLICATIONS

Mochida et al. (Pat. App. No. JP2002075359A).*
(Continued)

*Primary Examiner* — Matthew T Martin
*Assistant Examiner* — Felicity B Alban
(74) *Attorney, Agent, or Firm* — Birch, Stewart, Kolasch & Birch, LLP

(57) ABSTRACT

A method for preparing a spheronized carbonaceous negative electrode active material, including the steps of: mixing microgranular scaly graphite with macrogranular scaly graphite, wherein the macrogranular scaly graphite has a larger average particle diameter than the microgranular scaly graphite, to form a mixture, and spheronizing the mixture to prepare spheronized granulated particles; carrying out car-
(Continued)

bon coating of the spheronized granulated particles; and disintegrating the carbon-coated spheronized granulated particles.

12 Claims, 1 Drawing Sheet

(51) Int. Cl.
*H01M 10/052* (2010.01)
*H01M 4/02* (2006.01)

(58) Field of Classification Search
CPC .. H01M 10/052; H01M 4/1393; H01M 4/366; H01M 4/625; H01M 4/133; H01M 4/36; H01M 4/364; H01M 4/62; C01P 2004/61; C01P 2006/12; C01P 2006/14; C01B 32/21; C01B 32/05
See application file for complete search history.

(56) References Cited

U.S. PATENT DOCUMENTS

| | | |
|---|---|---|
| 8,133,612 B2 | 3/2012 | Zou et al. |
| 8,920,977 B2 | 12/2014 | Kameda et al. |
| 10,122,018 B2 | 11/2018 | Tsuchiya et al. |
| 2011/0171532 A1 | 7/2011 | Okanishi et al. |
| 2017/0187041 A1 | 6/2017 | Yamada et al. |
| 2019/0273248 A1 | 9/2019 | Yamada et al. |
| 2021/0391577 A1* | 12/2021 | Shao ................ H01M 4/623 |

FOREIGN PATENT DOCUMENTS

| | | |
|---|---|---|
| JP | 9-27314 A | 1/1997 |
| JP | 3440638 B2 | 8/2003 |
| JP | 2004-63321 A | 2/2004 |
| JP | 2006-528408 A | 12/2006 |
| JP | 2007-179956 A | 7/2007 |
| JP | 4215633 B2 | 1/2009 |
| JP | 2011-60465 A | 3/2011 |
| JP | 2013-197082 A | 9/2013 |
| JP | 2014-22041 A | 2/2014 |
| JP | 5668308 B2 | 2/2015 |
| JP | 2016-136517 A | 7/2016 |
| KR | 10-2006-0084430 A | 7/2006 |
| KR | 10-0686783 B1 | 2/2007 |
| KR | 10-2011-0033134 A | 3/2011 |
| KR | 10-2015-0063620 A | 6/2015 |
| KR | 10-2016-0136320 A | 11/2016 |
| WO | WO2016/125819 A1 | 8/2016 |
| WO | WO2018/097212 A1 | 5/2018 |

OTHER PUBLICATIONS

Yamada et al. (Pat. App. Pub. No. JP2016136517A).*
Tamaki et al. (Pat. App. Pub. No. WO2016125819A1).*
Manuel Mundszinger et al., "Morphology and texture of spheroidized natural and synthetic graphites", Carbon, Elsevier Oxford, vol. 111, Oct. 24, 2016, pp. 764-773.
Supplementary European Search Report for EP 20871902.1 mailed on Sep. 29, 2022.
International Search Report for PCT/KR2020/013430 mailed on Jan. 22, 2021.

* cited by examiner

GLOBULAR CARBON-BASED ANODE ACTIVE MATERIAL, METHOD FOR MANUFACTURING SAME, AND ANODE AND LITHIUM SECONDARY BATTERY COMPRISING SAME

TECHNICAL FIELD

The present disclosure relates to a spheronized carbonaceous negative electrode active material, a method for preparing the same, and a negative electrode and lithium secondary battery including the same. More particularly, the present disclosure relates to a spheronized carbonaceous negative electrode active material having reduced internal pores and an improved sphericity, a method for preparing the same, and a negative electrode and lithium secondary battery including the same.

The present application claims priority to Korean Patent Application No. 10-2019-0123397 filed on Oct. 4, 2019 in the Republic of Korea, the disclosures of which are incorporated herein by reference.

BACKGROUND ART

As technical development and needs for mobile instruments have been increased, secondary batteries as energy sources for such mobile instruments have been increasingly in demand. Among such secondary batteries, lithium secondary batteries having high energy density and operating voltage, long cycle life and a low discharge rate have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying slurry including an active material, a binder and a conductive material dispersed in a solvent to a current collector, followed by drying and pressing.

Lithium metal has been used to date as a negative electrode of a secondary battery. However, since it was known that lithium metal causes a short-circuit in a battery due to lithium dendrite formation, resulting in a risk of explosion, it has been substituted with a carbonaceous compound capable of reversible lithium ion intercalation/deintercalation and maintaining structural and electrical properties.

Such a carbonaceous compound has a significantly low discharge potential of about −3V based on the standard hydrogen electrode potential, and shows excellent electrode cycle life by virtue of significantly reversible charge/discharge behaviors derived from the monoaxial alignability of a graphene layer. In addition, the carbonaceous compound shows an electrode potential of 0V Vs. $Li/Li^+$ upon Li ion intercalation, which is substantially similar to the electrode potential of pure lithium metal. Therefore, when lithium metal forms a battery in combination with an oxide-based positive electrode, higher energy can be obtained advantageously.

Various types of carbonaceous materials, including artificial graphite, natural graphite and hard carbon, have been used as the carbonaceous compounds. Among the carbonaceous compounds, graphite is most widely used currently.

Among various types of graphite, natural graphite is used, after it is converted into graphite having a smooth surface shape through a post-treatment process, such as a spheronization process, in order to reduce irreversible reaction and to improve the processability of an electrode. In addition, when natural graphite is surface coated through the heat treatment of low-crystalline carbon, such as pitch, it is possible to prevent the edge surface of graphite from being exposed directly, to prevent destruction caused by an electrolyte, and to reduce irreversible reaction. The method for preparing a negative electrode active material by coating spherical natural graphite with low-crystalline carbon is used by the manufacturers of negative electrode materials.

However, the negative electrode active material obtained by the above-mentioned method is one prepared by spheronization of natural graphite having a scaly particle shape, and the spheronized graphite particles include a large amount of voids therein. Such voids reduce the density of a negative electrode active material, thereby making it difficult to manufacture a high-density negative electrode plate. In addition, since the low-crystalline carbon coating film is broken during a process of densifying a negative electrode active material on a current collector, the graphite edge surface is exposed, resulting in the problems of destruction caused by an electrolyte and irreversible reaction.

Further, natural graphite has a disadvantage of higher electrode swelling as compared to artificial graphite. Moreover, the internal pores generated during the spheronization of natural graphite are larger than the pores of artificial graphite, and the resultant coating film layer causes the problems of gas generation derived from side reactions at high temperature through such a larger amount of internal pores, and degradation of high-temperature storage characteristics.

DISCLOSURE

Technical Problem

The present disclosure is designed to solve the problems of the related art, and therefore the present disclosure is directed to providing a spheronized carbonaceous negative electrode active material having reduced internal pores and an improved sphericity, a method for preparing the same, and a negative electrode and lithium secondary battery including the same.

The present disclosure is also directed to providing a negative electrode including the negative electrode active material and a lithium secondary battery including the same.

Technical Solution

According to the present disclosure, there are provided a spheronized carbonaceous negative electrode active material, a method for preparing the same, and a negative electrode and lithium secondary battery including the same according to the following embodiments.

According to the first embodiment of the present disclosure, there is provided a method for preparing a spheronized carbonaceous negative electrode active material, including the steps of:

mixing microgranular scaly graphite with macrogranular scaly graphite wherein the macrogranular scaly graphite has a larger average particle diameter than the microgranular scaly graphite, to form a mixture, and spheronizing the mixture to prepare spheronized granulated particles;

carrying out carbon coating of the spheronized granulated particles; and disintegrating the carbon-coated spheronized granulated particles.

According to the second embodiment of the present disclosure, there is provided the method for preparing a spheronized carbonaceous negative electrode active material as defined in the first embodiment, wherein the microgranular scaly graphite has an average particle diameter of 20 μm to 50 μm, and the macrogranular scaly graphite has an average particle diameter of 50 μm to 100 μm.

According to the third embodiment of the present disclosure, there is provided the method for preparing a spheronized carbonaceous negative electrode active material as defined in the first or the second embodiment, wherein the macrogranular scaly graphite and the microgranular scaly graphite are present at a weight ratio of 70:30 to 40:60.

According to the fourth embodiment of the present disclosure, there is provided a spheronized carbonaceous negative electrode active material, which has a specific surface area of 1.5-2.8 $m^2/g$ and a total pore volume of $1.0e^{-2}$ $cm^3/g$ to $1.8e^{-2}$ $cm^3/g$, and the pores having a size of 24 nm or more in the negative electrode active material have a specific surface area of 0.1 $m^2/g$ to 0.8 $m^2/g$.

According to the fifth embodiment of the present disclosure, there is provided the spheronized carbonaceous negative electrode active material as defined in the fourth embodiment, which has a specific surface area of 1.8 $m^2/g$ to 2.5 $m^2/g$.

According to the sixth embodiment of the present disclosure, there is provided the spheronized carbonaceous negative electrode active material as defined in the fourth or the fifth embodiment, which has a total pore volume of $1.19e^{-2}$ to $1.57e^{-2}$ $m^3/g$.

According to the seventh embodiment of the present disclosure, there is provided the spheronized carbonaceous negative electrode active material as defined in any one of the fourth to the sixth embodiments, wherein the pores having a size of 24 nm or more in the negative electrode active material have a specific surface area of 0.3 $m^2/g$ to 0.7 $m^2/g$.

According to the eighth embodiment of the present disclosure, there is provided the spheronized carbonaceous negative electrode active material as defined in any one of the fourth to the seventh embodiments, which has an average particle diameter of 10 μm to 20 μm.

According to the ninth embodiment of the present disclosure, there is provided the spheronized carbonaceous negative electrode active material as defined in any one of the fourth to the eighth embodiments, which has a sphericity of 0.82 to 0.98.

According to the tenth embodiment of the present disclosure, there is provided a negative electrode including a current collector and a negative electrode active material layer on at least one surface of the current collector, wherein the negative electrode active material layer includes the spheronized carbonaceous negative electrode active material as defined in any one of the fourth to the ninth embodiments.

According to the eleventh embodiment of the present disclosure, there is provided a lithium secondary battery including the negative electrode as defined in the tenth embodiment.

Advantageous Effects

According to an embodiment of the present disclosure, instead of spheronization using one kind of scaly graphite according to the related art, spheronization is carried out after mixing scaly graphite having a larger average particle diameter with scaly graphite having a smaller average particle diameter. In this manner, it is possible to provide a spheronized carbonaceous negative electrode active material having an improved sphericity and reduced internal pores. When applying the negative electrode active material to a negative electrode of a secondary battery, it is possible to provide a secondary battery which shows reduced internal stress and improved swelling characteristics, and has a high capacity retention during storage at high temperature.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
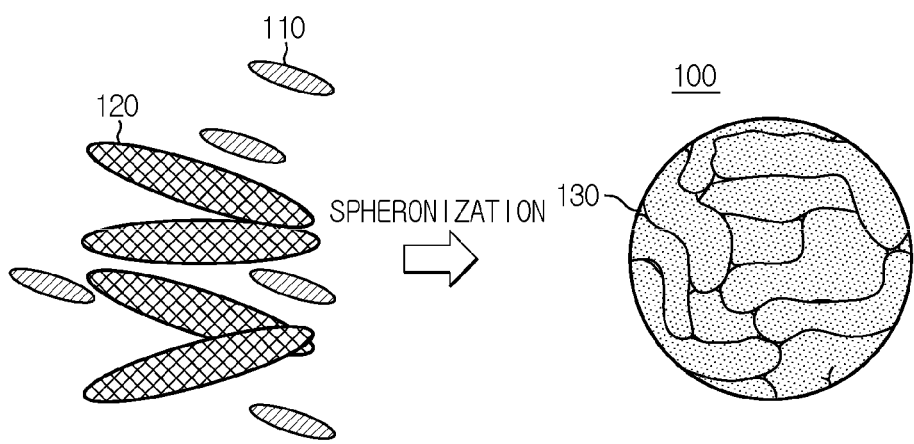
FIG. 1 is a schematic view illustrating the spheronization step of the method for preparing a spheronized carbonaceous negative electrode active material according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a method for preparing a spheronized carbonaceous negative electrode active material, including the steps of:

mixing microgranular scaly graphite with macrogranular scaly graphite having a larger average particle diameter as compared to the microgranular scaly graphite, and spheronizing the resultant mixture to prepare spheronized granulated particles;

carrying out carbon coating of the spheronized granulated particles; and disintegrating the carbon-coated spheronized granulated particles.

When spheronization is carried out by using scaly graphite having a single average particle diameter according to the related art, a large amount of internal pores are generated in the spheronized particles and side reactions occur in such internal pores. To solve the above-mentioned problem, spheronization is carried out, after mixing two kinds of scaly graphite having a different average particle diameter, i.e. microgranular scaly graphite and macrogranular scaly graphite having a larger average particle diameter as compared to the microgranular graphite (macrogranular scaly graphite having a larger average particle diameter and microgranular scaly graphite having a smaller average particle diameter) with each other, according to the present disclosure. In this manner, the present disclosure is directed to providing a spheronized carbonaceous negative electrode active material which has reduced internal pores and an improved sphericity, inhibits electrode swelling, when being used for an electrode of a battery, and provides improved high-temperature storage characteristics to a battery.

Hereinafter, each step of the method will be explained in detail.

First, microgranular scaly graphite is mixed with macrogranular graphite having a larger average particle diameter as compared to the microgranular scaly graphite, and then the resultant mixture is spheronized to prepare spheronized granulated particles.

In this step, microgranular scaly graphite and macrogranular scaly graphite having a larger average particle diameter as compared to the microgranular scaly graphite are prepared at a predetermined weight ratio, and then they are mixed and spheronized to prepare spheronized granulated particles.

In this step, while the macrogranular scaly graphite particles are in contact with one another to form assembled particles, the microgranular scaly graphite particles are inserted to the vacant spaces (voids) formed among the macrogranular scaly graphite particles so that the vacant spaces (voids) may be filled with the microgranular scaly graphite. In this manner, it is possible to reduce internal pores and to provide more densified spheronized particles.

In this step, a mixture of microgranular scaly graphite with macrogranular scaly graphite may be used as a starting material and subjected to a spheronization process generally known to those skilled in the art, such as application of mechanical treatment, including impact compression, friction or shear force. The mechanical treatment may be carried out by using a spheronization device generally known to those skilled in the art, and particular examples of such devices include a mill, such as a counter jet mill (Hosokawa Micron, JP), ACM pulverizer (Hosokawa Micron, JP) or a current jet (Nissin, JP), a particle assembler, such as SARARA (Kawasaki Heavy Industries, Ltd., JP), GRA-NUREX (Freund Corporation, JP), New-Gra Machine (Seishin, JP) or Acromaster (Kosokawa Micron, JP), a kneader, such as a dispersion kneader or two-roll, a compression shear processing device, such as a mechano-micro system, an extruder, a ball mill, a planetary mill, a mechano-fusion system, Nobilta, hybridization or a rotary ball mill, or the like.

According to an embodiment of the present disclosure, the mixture is introduced to a spheronization device to which mechanical shear force is applied to form assembled particle cores, and then spheronized granulated particles having one or more surface layers stacked on and bound spherically to the surface portions of the assembled particle cores in the concentric circular direction may be formed. The assembled particle cores and the surface layers are formed at the same time, thereby forming spheronized granulated particles.

According to an embodiment of the present disclosure, a rotary processing machine is used to process the mixture of microgranular scaly graphite with macrogranular scaly graphite repeatedly to obtain spheronized granulated particles. As a result of repeated rotation, the microgranular scaly graphite and macrogranular scaly graphite are assembled through the pulverization caused by the collision between the mixture of microgranular scaly graphite with macrogranular scaly graphite and the inner surface of the processing machine, friction among graphite particles, shear processing caused by shear stress, or the like. Finally, spheronized granulated particles can be obtained. Herein, the pulverization time and rate may be controlled within an adequate range depending on the amount of graphite introduced to the machine.

In addition, this step may further include a step of isotropically pressurizing the resultant spheronized granulated particles to improve the contactability between the microgranular scaly graphite and macrogranular scaly graphite contained in the spheronized granulated particles.

Herein, 'isotropically pressurizing' refers to uniformly pressurizing the spheronized granulated particles three-dimensionally. To carry out isotropic pressurization of the spheronized granulated particles, water or argon may be used as a medium at room temperature, or cold isotropic pressurization may be carried out at room temperature.

In addition, although there is no particular limitation in the pressure applied during the isotropic pressurization of the spheronized granulated particles, a pressure of 50-100 atm is preferred and a pressure of 100-200 atm is more preferred.

The term 'scaly graphite' refers to natural graphite having a scaly particle shape and may be obtained by pulverizing natural graphite having a scaly shape, a plate-like shape, a crushed shape, a tablet-like shape, etc. into a desired particle size.

According to an embodiment of the present disclosure, the microgranular scaly graphite may have an average particle diameter of 20-50 μm, or 25-45 μm, and the macrogranular scaly graphite may have an average particle diameter of 50-100 μm, or 55-90 μm. When each of the microgranular scaly graphite and macrogranular graphite has an average particle diameter within the above-defined range, internal pores are reduced, and thus side reactions of the resultant coating film layer at high temperature through the internal pores and gas generation may be reduced, and high-temperature storage characteristics may be improved.

According to an embodiment of the present disclosure, the weight ratio of macrogranular scaly graphite and microgranular scaly graphite may be 70:30-40:60, 70:30-45:55, 70:30-50:50, or 50:50-45:55. When the weight ratio of macrogranular scaly graphite and microgranular scaly graphite satisfies the above-defined range, it is possible to control the internal pores advantageously.

Referring to FIG. 1 illustrating an embodiment of the present disclosure, microgranular scaly graphite 110 is mixed with macrogranular scaly graphite 120, and then the resultant mixture is subjected to the above-mentioned spheronization process to obtain spheronized granulated particles 100. Herein, in the spheronized granulated particles 100, the vacant spaces formed among the macrogranular scaly graphite particles 120 are filled with the microgranular scaly graphite 110, and thus internal pores 130 are significantly reduced.

Figure 2:
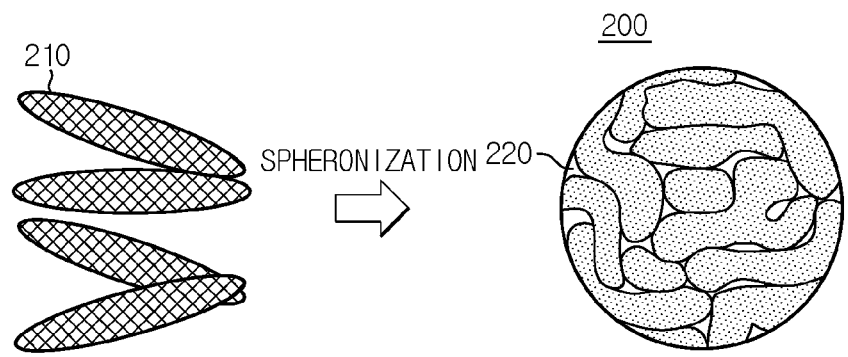
FIG. 2 is a schematic view illustrating the spheronization step of the method for preparing a spheronized carbonaceous negative electrode active material according to the related art.

Meanwhile, referring to FIG. 2 illustrating the related art, macrogranular scaly graphite 210 is used alone and subjected to the spheronization process. In this case, spheronized granulated particles 200 can be obtained, but the vacant spaces formed among the macrogranular scaly graphite particles 210 still remain in the spheronized granulated particles 200 to provide a large amount of internal pores 220.

Next, the spheronized granulated particles are coated with carbon.

In the carbon coating step, the spheronized granulated particles prepared from the preceding step are mixed homogeneously with a carbon coating material so that the carbon coating material may be attached to the surfaces of the spheronized granulated particles, and then the resultant product is carbonized to form carbon coating layers on the surfaces of the spheronized granulated particles. The carbon material forms coating layers on the surfaces of the spheronized granulated particles so that the microgranular scaly graphite and macrogranular scaly graphite forming the spheronized granulated particles may be further bound to each other. In this manner, it is possible to prevent degradation of the stability of the spheronized granulated particles that may occur during repeated charge/discharge cycles.

The carbon coating material may be prepared from a carbon precursor including sucrose, phenolic resin, naphthalene resin, polyvinyl alcohol resin, furfuryl alcohol resin, polyacrylonitrile resin, polyamide resin, furan resin, cellulose resin, styrene resin, polyimide resin, epoxy resin or vinyl chloride resin, coal pitch, petroleum pitch, polyvinyl chloride, mesophase pitch, tar, block copolymer, low-molecular weight heavy oil or a mixture thereof.

Herein, the carbon coating material may be used in an amount of 1-10 parts by weight, or 3-6 parts by weight, based on 100 parts by weight of the spheronized granulated particles. When the amount of the carbon coating layers satisfies the above-defined range, it is possible to prevent the problems of a de-capacity per weight, caused by the formation of an excessively thick coating layer, and a decrease in initial efficiency caused by irreversibility, or the problems of an increase in side reactions, caused by an increase in specific surface area of an active material resulting from the formation of an excessively thin coating layer, and degradation of life efficiency, caused by the exfoliation of a coating layer during charge/discharge cycles. It is also possible to assist the formation of an initial SEI layer, and thus to improve the stability of the spheronized granulated particles during repeated charge/discharge cycles.

The method for mixing the surfaces of the spheronized granulated particles with the carbon coating material is not particularly limited, and any method generally known to those skilled in the art may be used. For example, the mixing may be carried out by using mechanical and chemical processes, such as a kneader, such as a two-roll, blade, a mechano micro-system, an extruder, a ball mill, a planetary mill, a mechano-fusion system, Nobilta, a hybridization or a rotary ball mill, or by using a spray drying process or an emulsifying process.

After the carbon coating material is mixed homogeneously with the spheronized granulated particles as described above, the resultant mixture is carbonized at a temperature of 900-1,300° C. for 12-48 hours so that carbon coating layers may be formed on the spheronized granulated particles. The formed carbon coating layers may include amorphous or crystalline carbon. When the carbonization condition is satisfied, the carbon coating material may be stabilized sufficiently, impurities in the carbon coating material may be removed completely, and degeneration of the coated surface properties of carbon coating material at high temperature may be prevented.

Then, the carbon-coated spheronized granulated particles are disintegrated.

The spheronized granulated particles obtained from the carbonization in the carbon coating step of the spheronized granulated particles may be agglomerated with one another. Thus, the agglomerated particles are subjected to a disintegration process.

In the disintegration step, the agglomerated particles may be disintegrated with ease merely by applying a slight level of shear force to the agglomerated spheronized granulated particles. The disintegration process is not particularly limited. For example, the disintegration may be carried out by using an agitator having agitation blades, or by using a known mill, such as a conventional jet mill, vibration mill, pin mill, hammer mill, or the like.

In another aspect of the present disclosure, there is provided a spheronized carbonaceous negative electrode active material, which has a specific surface area of 1.5-2.8 $m^2/g$ and a total pore volume of $1.0e^{-2}$ to $1.8e^{-2}$ $cm^2/g$, and the pores having a size of 24 nm or more in the negative electrode active material have a specific surface area of 0.1-0.8 $m^2/g$.

According to an embodiment of the present disclosure, the spheronized carbonaceous negative electrode material may be obtained by the above-described method for preparing a spheronized carbonaceous negative electrode active material.

The negative electrode active material has a specific surface area of 1.5-2.8 $m^2/g$. According to an embodiment of the present disclosure, the negative electrode active material may have a specific surface area of 1.8-2.5 $m^2/g$. When the specific surface area of the negative electrode active material satisfies the above-defined range, side reactions with an electrolyte may be reduced to provide improved high-temperature storage characteristics advantageously.

Herein, the specific surface area is determined by the BET method. Particularly, the specific surface area may be calculated from nitrogen gas adsorption at the temperature (77K) of liquid nitrogen using BELSOR-mino II available from BEL, Japan.

The negative electrode active material has a total pore volume of $1.0e^{-2}$ to $1.8e^{-2}$ $cm^3/g$. According to an embodiment of the present disclosure, the negative electrode active material may have a total pore volume of $1.19e^{-2}$ to $1.57e^{-2}$ $cm^3/g$. When the total pore volume of the negative electrode active material satisfies the above-defined range, side reactions with an electrolyte may be reduced to provide improved high-temperature storage characteristics advantageously.

Herein, the total pore volume of the negative electrode active material may be determined by the BET method, similarly to the determination of specific surface area, and by using the same system as the determination of specific surface area.

In addition, the pores having a size of 24 nm or more in the negative electrode active material have a specific surface area of 0.1-0.8 $m^2/g$. According to an embodiment of the present disclosure, the specific surface area may be 0.3-0.7 $m^2/g$. When the specific surface area of pores having a size of 24 nm or more in the negative electrode active material satisfies the above-defined range, side reactions with an electrolyte may be reduced advantageously.

The specific surface area of the pores having a size of 24 nm or more in the negative electrode active material may be determined by the BET method, similarly to the determination of specific surface area, and by using the same system as the determination of specific surface area.

Particularly, it is important to satisfy all of the conditions: the negative electrode active material has a specific surface area of 1.5-2.8 $m^2/g$; the negative electrode active material has a total pore volume of $1.0e^{-2}$ to $1.8e^{-2}$ $cm^3/g$; and the pores having a size of 24 nm or more in the negative electrode active material have a specific surface area of 0.1-0.8 $m^2/g$, since this reduces irreversibility, inhibits side reactions, and inhibits swelling caused by gas generation during long-term storage.

According to an embodiment of the present disclosure, the spheronized carbonaceous negative electrode active material may have an average particle diameter of 10-20 μm, or 11-18 μm.

The average particle diameter, $D_{50}$, means the particle diameter at the point of 50% in the particle number accumulated distribution as a function of particle diameter. For example, $D_{90}$ means the particle diameter at the point of 90% in the particle number accumulated distribution as a function of particle diameter, and $D_{10}$ means the particle diameter at the point of 10% in the particle number accumulated distribution as a function of particle diameter.

The average particle diameter may be determined by using the laser diffraction method. Particularly, powder to be analyzed is dispersed in a dispersion medium and introduced to a commercially available laser diffraction particle size analyzer (e.g. Microtrac S3500) to measure a difference in diffraction pattern depending on particle size, when the particles pass through laser beams, and then particle size distribution can be calculated. Then, $D_{10}$, $D_{50}$ and $D_{90}$ may be determined by calculating the particle diameter at the point of 10%, 50% and 90%, respectively, in the particle number accumulated distribution depending on particle diameter in the analyzer system.

The spheronized carbonaceous negative electrode active material may have a sphericity of 0.82-0.98, or 0.88-0.92.

The sphericity may be a value obtained by dividing the circumference of a circle having the same area as the projected image of the negative electrode active material by the circumferential length of the projected image, and particularly, may be represented by the following Mathematical Formula 1. The sphericity may be determined by using a particle shape analyzer, such as Sysmex FPIA3000 available from Malvern Co.

Sphericity=Circumference of circle having the same area as projected image of active material/Circumferential length of projected image [Mathematical Formula 1]

In still another aspect of the present disclosure, there is provided a negative electrode including the negative electrode active material.

Particularly, the negative electrode according to an embodiment of the present disclosure includes a current collector, and a negative electrode active material layer disposed on at least one surface of the current collector and including the negative electrode active material according to an embodiment of the present disclosure.

The electrode layer may be formed by coating slurry for a negative electrode active material layer, prepared by dispersing the negative electrode active material according to the present disclosure, a binder and a conductive material in a solvent, on at least one surface of a current collector, followed by drying and pressing.

The current collector is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used. Although the current collector is not particularly limited in its thickness, it may have a thickness of 3-500 μm.

The negative electrode active material may be used in an amount of 80-99 wt % based on the total weight of the negative electrode slurry composition.

The binder is an ingredient which assists the binding between the conductive material and the active material, or the binding to the current collector, and is generally used in an amount of 0.1-20 wt % based on the total weight of the negative electrode slurry composition. Particular examples of the binder include polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, styrene butadiene rubber (SBR), lithium polyacrylate (Li-PAA), or the like. More particularly, lithium polyacrylate can impart higher adhesion as compared to the other binders, such as SBS/CMC, when it is used for a negative electrode including an active material having a high silicon content of about 80%. By virtue of the above-mentioned characteristic, lithium polyacrylate is advantageous in that it is possible to accomplish high capacity retention during charge/discharge, when lithium polyacrylate is used for a Si-based negative electrode.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; conductive materials, such as polyphenylene derivatives, or the like. The conductive material may be added in an amount of 0.1-20 wt %, based on the total weight of the negative electrode slurry composition.

The dispersion medium may include water or an organic solvent, such as N-methyl-2-pyrrolidone (NMP), and may be used in such an amount that the negative electrode slurry including the negative electrode active material optionally with a binder and a conductive material may have a desired level of viscosity.

In addition, there is no particular limitation in the coating process of the negative electrode slurry, as long as it is a method used currently in the art. For example, a coating process using a slot die may be used. In addition to this, a Mayer bar coating process, a gravure coating process, a dip coating process, a spray coating process, etc. may be used.

In still another aspect of the present disclosure, there is provided a lithium secondary battery including the negative electrode. Particularly, the lithium secondary battery may be obtained by injecting a lithium salt-containing electrolyte to an electrode assembly including a positive electrode, the above-described negative electrode, and a separator interposed between the positive electrode and the negative electrode.

The positive electrode may be obtained by mixing a positive electrode active material, a conductive material, a binder and a solvent to form slurry and coating the slurry directly onto a metal current collector, or casting the slurry onto a separate support, peeling a positive electrode active material film from the support and laminating the film on a metal current collector.

The positive electrode active material used in the positive electrode may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x<0.5$, $0 \leq y<0.5$, $0 \leq z<0.5$, and $0<x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefininc polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2$, $CH_3CO_2$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size device include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(Preparation of Spheronized Carbonaceous Negative Electrode Active Material) Macrogranular scaly graphite having an average particle diameter of 75 μm and microgranular scaly graphite having an average particle diameter of 35 μm were prepared at a weight ratio of 70:30, mixed by using a ball mill, and spheronized by using a counter jet mill (Hosokawa Micron, JP) to obtain spheronized granulated particles. Then, 100 parts by weight of the resultant spheronized granulated particles were mixed with 5 parts by weight of pitch (solid pitch) as a carbon coating material, the resultant mixture was carbonized at a temperature of 1,500° C. for 24 hours to carry out carbon coating, and then the carbon-coated spheronized granulated particles were disintegrated to obtain a spheronized carbonaceous negative electrode active material.

(Manufacture of Negative Electrode)

The spheronized carbonaceous negative electrode active material obtained as described above, Super C65 as a conductive material, styrene butadiene rubber (SBR) as a binder and carboxymethyl cellulose (CMC) as a thickener were mixed at a weight ratio of 96.6:1:1.3:1.1, and water was added thereto to prepare negative electrode slurry. The resultant slurry was applied to copper foil and vacuum dried at a temperature of about 130° C. for 10 hours to obtain a negative electrode having an area of 1.4875 cm². Herein, the negative electrode was prepared with a loading amount of 3.61 mAh/cm².

(Manufacture of Coin-Type Secondary Battery)

The negative electrode obtained as described above was used as a working electrode and Li metal cut into an area of 1.7671 cm² was used as a counter electrode. In addition, a porous polyethylene separator was interposed between the working electrode and the counter electrode to form an electrode assembly. Then, ethylene carbonate (EC) was mixed with ethylmethyl carbonate (EMC) at a volume ratio of 1:4, and 0.5 wt % of vinylene carbonate (VC) as an additive for non-aqueous electrolyte and 1 M LiPF$_6$ were added to the mixed solvent to prepare a non-aqueous electrolyte. The electrode assembly was received in a coin-type casing and the non-aqueous electrolyte was injected thereto to obtain a coin-type half-cell secondary battery.

Example 2

A spheronized carbonaceous negative electrode active material was obtained in the same manner as Example 1, except that macrogranular scaly graphite having an average particle diameter of 75 μm and microgranular scaly graphite having an average particle diameter of 35 μm were prepared at a weight ratio of 50:50.

In addition, a secondary battery was obtained in the same manner as Example 1, except that the negative electrode active material obtained as described above was used.

Example 3

A spheronized carbonaceous negative electrode active material was obtained in the same manner as Example 1, except that macrogranular scaly graphite having an average particle diameter of 75 μm and microgranular scaly graphite having an average particle diameter of 35 μm were prepared at a weight ratio of 45:55.

In addition, a secondary battery was obtained in the same manner as Example 1, except that the negative electrode active material obtained as described above was used.

Comparative Example 1

A spheronized carbonaceous negative electrode active material was obtained in the same manner as Example 1, except that macrogranular scaly graphite having an average particle diameter of 75 μm was used alone, and microgranular scaly graphite having an average particle diameter of 35 μm was not used.

In addition, a secondary battery was obtained in the same manner as Example 1, except that the negative electrode active material obtained as described above was used.

Comparative Example 2

A spheronized carbonaceous negative electrode active material was obtained in the same manner as Example 1, except that macrogranular scaly graphite having an average particle diameter of 75 μm was not used, and microgranular scaly graphite having an average particle diameter of 35 μm was used alone.

In addition, a secondary battery was obtained in the same manner as Example 1, except that the negative electrode active material obtained as described above was used.

Test Methods and Results

Specific Surface Area of Negative Electrode Active Material, Total Pore Volume of Negative Electrode Active Material, and Specific Surface Area of Pores Having Size of 24 nm or More in Negative Electrode Active Material Each of the negative electrode active materials according to Examples 1-3 and Comparative Examples 1 and 2 was determined in terms of the specific surface area, total pore volume, and the specific surface area of pores having a size of 24 nm or more in the negative electrode active material by using the BET method. Particularly, the specific surface area, total pore volume and the specific surface area of pores of 24 nm or more were calculated from nitrogen gas adsorption at the temperature (77K) of liquid nitrogen using BELSOR-mino II available from BEL, Japan.

Average Particle Diameter of Negative Electrode Active Material

Each of the negative electrode active materials according to Examples 1-3 and Comparative Examples 1 and 2 was dispersed in water as a dispersion medium, and then introduced to a laser diffraction particle size analyzer (Microtrac 53500) to measure a difference in diffraction pattern depending on particle size, when the negative electrode active material particles pass through laser beams, and then particle size distribution was calculated. Then, $D_{50}$, average particle diameter, was determined by calculating the particle diameter at the point of 50% in the particle number accumulated distribution depending on particle diameter in the analyzer system.

Sphericity of Negative Electrode Active Material

The sphericity of each of the negative electrode active materials according to Examples 1-3 and Comparative Examples 1 and 2 is defined by the following Mathematical Formula 1. The sphericity was determined by using a particle shape analyzer, Sysmex FPIA3000 available from Malvern Co.

Sphericity=Circumference of circle having the same area as projected image of active material/Circumferential length of projected image [Mathematical Formula 1]

Swelling Characteristics

Each of the secondary batteries according to Examples 1-3 and Comparative Examples 1 and 2 was determined for the swelling ratio, after it was subjected to 30 charge/discharge cycles under the conditions of a charge/discharge current of 0.1 C and a charge/discharge voltage of 5 mV to 1.5V. The results are shown in the following Table 1.

Herein, the swelling ratio (%) is defined by the following formula.

Swelling ratio (%)=[(Electrode thickness after charge/discharge cycles−Initial electrode thickness)/(Initial electrode thickness)]×100

High-Temperature Storage Characteristics

After each of the secondary batteries according to Examples 1-3 and Comparative Examples 1 and 2 was stored at 60° C. at 100% of SOC (state-of-charge) for 4 weeks, it was charged/discharged at room temperature under the conditions of a charge/discharge current of 0.1 C and a charge/discharge voltage of 5 mV to 1.5V to determine the capacity retention. The results are shown in the following Table 1.

Herein, the capacity retention (%) is defined by the following formula.

Capacity retention (%)=[(Capacity after high-temperature storage)/(Initial capacity)]×100

TABLE 1

|  | Specific surface area of negative electrode active material (m²/g) | Total pore volume of negative electrode active material (cm³/g) | Specific surface area of pores having a size of 24 nm or more in negative electrode active material (m²/g) | Average particle diameter of negative electrode active material (μm) | Sphericity of negative electrode active material | Swelling characteristics of secondary battery (%) | High-temperature capacity retention of secondary battery (%) |
|---|---|---|---|---|---|---|---|
| Ex. 1 | 1.8 | 1.19 e⁻² | 0.3 | 16 | 0.89 | 24 | 88 |
| Ex. 2 | 2.2 | 1.46 e⁻² | 0.6 | 15 | 0.89 | 26 | 85 |
| Ex. 3 | 2.5 | 1.57 e⁻² | 0.7 | 15 | 0.89 | 27 | 85 |
| Comp. Ex. 1 | 3.1 | 2.59 e⁻² | 0.8 | 16 | 0.88 | 32 | 70 |
| Comp. Ex. 2 | 4.0 | 2.78 e⁻² | 0.9 | 12 | 0.88 | 30 | 65 |

As can be seen from Table 1, each of the secondary batteries using the negative electrode active materials according to Examples 1-3 shows improved results of swelling characteristics and high-temperature storage capacity retention characteristics, as compared to the secondary batteries using the negative electrode active materials according to Comparative Examples 1 and 2.

What is claimed is:

1. A spheronized carbonaceous negative electrode active material having a specific surface area of 1.5 m²/g to 2.8 m²/g and a total pore volume of $1.0e^{-2}$ cm³/g to $1.8e^{-2}$ cm³/g,
wherein pores having a size of 24 nm or more in the negative electrode active material have a specific surface area of 0.1 m²/g to 0.8 m²/g.

2. The spheronized carbonaceous negative electrode active material according to claim 1, wherein the specific surface area of the negative electrode active material is 1.8 m²/g to 2.5 m²/g.

3. The spheronized carbonaceous negative electrode active material according to claim 1, wherein the total pore volume of the negative electrode active material is $1.19e^{-2}$ cm³/g to $1.57e^{-2}$ cm³/g.

4. The spheronized carbonaceous negative electrode active material according to claim 1, wherein the pores having the size of 24 nm or more in the negative electrode active material have a specific surface area of 0.3 m²/g to 0.7 m²/g.

5. The spheronized carbonaceous negative electrode active material according to claim 4, having wherein the negative electrode active material has an average particle diameter of 10 μm to 20 μm.

6. The spheronized carbonaceous negative electrode active material according to claim 4, having wherein the negative electrode active material has a sphericity of 0.82 to 0.98.

7. A negative electrode, comprising:
a current collector; and
a negative electrode active material layer on at least one surface of the current collector,
wherein the negative electrode active material layer comprises the spheronized carbonaceous negative electrode active material as defined in claim 1.

8. A lithium secondary battery comprising the negative electrode as defined in claim 7.

9. The spheronized carbonaceous negative electrode active material according to claim 1, wherein the total pore volume of the negative electrode active material is $1.0e^{-2}$ cm³/g to $1.57e^{-2}$ cm³/g.

10. A method for preparing the spheronized carbonaceous negative electrode active material according to claim 1, comprising the steps of: mixing microgranular scaly graphite with macrogranular scaly graphite, wherein the macrogranular scaly graphite has a larger average particle diameter than the microgranular scaly graphite, to form a mixture, and spheronizing the mixture to prepare spheronized granulated particles; carrying out carbon coating of the spheronized granulated particles; and disintegrating the carbon-coated spheronized granulated particles.

11. The method for preparing the spheronized carbonaceous negative electrode active material according to claim 10, wherein the microgranular scaly graphite has an average particle diameter of 20 μm to 50 μm, and the macrogranular scaly graphite has an average particle diameter of 50 μm to 100 μm.

12. The method for preparing the spheronized carbonaceous negative electrode active material according to claim 10, wherein the macrogranular scaly graphite and the microgranular scaly graphite are present at a weight ratio of 70:30 to 40:60.

* * * * *